United States Patent
Becker et al.

(10) Patent No.: US 9,459,352 B2
(45) Date of Patent: Oct. 4, 2016

(54) MULTI-SENSOR PROXIMITY SENSING USING A NEAR ZONE LIGHT SENSOR AND A FAR ZONE LIGHT SENSOR

(71) Applicant: TEXAS INSTRUMENTS INCORPORATED, Dallas, TX (US)

(72) Inventors: James H. Becker, Sunnyvale, CA (US); Tony R. Larson, Tucson, AZ (US); Dimitar T. Trifonov, Vail, AZ (US); Zhongyan Sheng, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 147 days.

(21) Appl. No.: 14/549,000

(22) Filed: Nov. 20, 2014

(65) Prior Publication Data
US 2016/0146938 A1 May 26, 2016

(51) Int. Cl.
*G01S 17/32* (2006.01)
*G01S 17/02* (2006.01)
*G01S 7/481* (2006.01)

(52) U.S. Cl.
CPC .............. *G01S 17/32* (2013.01); *G01S 7/4813* (2013.01); *G01S 17/026* (2013.01)

(58) Field of Classification Search
CPC .... G01S 17/32; G01S 17/026; G01S 7/4813; G06F 3/017; G06F 3/0346; G06F 3/01
USPC ...................... 250/221, 216, 214.1, 214 AL; 345/173–179
See application file for complete search history.

(56) References Cited

U.S. PATENT DOCUMENTS

| 7,957,762 | B2 | 6/2011 | Herz et al. | |
| 2014/0218340 | A1* | 8/2014 | Rai | G06F 3/017 345/175 |

* cited by examiner

*Primary Examiner* — Que T Le
(74) *Attorney, Agent, or Firm* — John R. Pessetto; Charles A. Brill; Frank D. Cimino

(57) ABSTRACT

An apparatus includes a light source to generate source light through an optically transmissive medium to an object. A receiver includes a near zone light sensor and a far zone light sensor positioned on a substrate with the light source. The near zone light sensor is positioned on the substrate to, in response to the generated source light, receive reflected source light from the object and the optically transmissive medium. The far zone light sensor is positioned on the substrate to, in response to the source light, receive the reflected source light from the object and to receive a reduced quantity of the reflected source light from the optically transmissive medium compared to the near zone light sensor.

20 Claims, 5 Drawing Sheets

MULTI-SENSOR PROXIMITY SENSING USING A NEAR ZONE LIGHT SENSOR AND A FAR ZONE LIGHT SENSOR

TECHNICAL FIELD

This disclosure relates to a proximity sensor that employs multiple optical sensors.

BACKGROUND

Proximity sensors are employed to detect the presence or absence of an object that appears within a given distance of the sensor. In one example, a proximity sensor can detect when an object, such as a user's face, is within proximity of a cell phone. If user detection is determined, interface inputs on the phone can be disabled when the person is talking so that contact with the user's face does not inadvertently select an input while talking. Proximity sensors can utilize various electromagnetic properties such as light, acoustics, inductance, or capacitance to detect objects. Proximity sensors that utilize light typically employ a light emitting diode (LED) that emits light toward an object, which is reflected and then received by a single photodetector to detect the presence of the object. In some applications, the light must be transferred and reflected through a protective optically transparent covering, such as through the glass cover of a cell phone, for example.

SUMMARY

This disclosure relates to a proximity sensor that employs multiple receiving sensors.

In one example, an apparatus includes a light source to generate source light through an optically transmissive medium to an object. A receiver includes a near zone light sensor and a far zone light sensor positioned on a substrate with the light source. The near zone light sensor is positioned on the substrate to, in response to the generated source light, receive reflected source light from the object and the optically transmissive medium. The far zone light sensor is positioned on the substrate to, in response to the source light, receive the reflected source light from the object and to receive a reduced quantity of the reflected source light from the optically transmissive medium compared to the near zone light sensor.

In another example, an apparatus includes a light source to generate source light through an optically transmissive medium to an object. A receiver includes a plurality of photodetectors, at least one of the plurality of photodetectors configured as a near zone light sensor and at least one of the plurality of photodetectors configured as a far zone light sensor. The plurality of photodetectors being positioned on a substrate with the light source, wherein the near zone light sensor is positioned on the substrate to receive reflected source light from the object and the optically transmissive medium. The far zone light sensor is positioned on the substrate to receive the reflected source light from the object and to receive a reduced quantity of the reflected source light reflected from a surface of the optically transmissive medium. A lens is positioned over the plurality of photodetectors to focus the source light received from the optically transmissive medium and the object on to the plurality of photodetectors. A photodetector selector switch device selectively activates a subset of the plurality of photodetectors corresponding to the near zone light sensor and the far zone light sensor such that the subset of photodectors is positioned under the lens to receive the focused source light.

In yet another example, a system includes a light source to generate source light through an optically transmissive medium to an object. A receiver includes a near zone light sensor and a far zone light sensor positioned on a substrate with the light source. The near zone light sensor is positioned on the substrate to receive reflected source light from the object and the optically transmissive medium and to provide a near sensor output signal in response to the received source light. The far zone light sensor is positioned on the substrate to receive the reflected source light from the object and to receive a reduced quantity of the reflected source light reflected from a surface of the optically transmissive medium and to provide a far sensor output signal in response to the received source light. A processor circuit detects presence of the object by comparing the near sensor output signal to a predetermined near zone threshold and comparing far sensor output signal to a predetermined far zone threshold. The presence of the object is detected if at least one of the near zone threshold or the far zone threshold is exceeded.

DETAILED DESCRIPTION

This disclosure relates to a proximity sensor that employs multiple receiving sensors. The proximity sensor can be provided as an apparatus to detect proximity of objects using light. The proximity sensor includes a light source such as a light emitting diode (LED), for example, to generate light through an optically transmissive medium (e.g., glass, plastic) to an object to be detected. As used herein, an optically transmissive medium can refer to any crystalline or amorphous medium that is optically transparent to at least the light transmitted by the light source of the proximity sensor. For the example of a cellular telephone, the optically transmissive medium can include the digitizer front glass that covers the liquid crystal display. A receiver in the proximity sensor includes multiple sensors that are positioned on a substrate to discriminate reflected light received from the object from light reflected by the transmissive medium.

The receiver can include a near zone light sensor and a far zone light sensor that are positioned on the substrate with the light source and are configured to detect light in the wavelength (e.g., a wavelength spectrum) emitted by the light source of the proximity sensor. The near zone light sensor can be positioned on the substrate to receive reflected light from the object and the transmissive medium. The near zone light sensor can have its output calibrated (e.g., above the level of the light reflected from the transmissive medium) to detect the presence of objects that are within a predetermined distance of the receiver. The far zone light sensor can be positioned on the substrate to receive the reflected light from the object and to receive a reduced quantity of the reflected light from the transmissive medium compared to the near zone sensor. The far zone light sensor can be positioned and/or configured such that substantially all of the reflected light from the transmissive medium in response to light from the light source is not received by the far zone sensor. As used herein, the term substantially as a modifier notes that the intended effect is to preclude receipt of the light reflected internally from the transmissive medium, although some trace amounts (e.g., about 5% or less) of the reflected light may be received. The far zone light sensor can detect the object's presence at further distances from the receiver than detected by the near zone sensor. By analyzing output from both the near and far zone light sensors, objects can be detected at varying distances from the proximity sensor while obviating the need to employ restrictive mechanical barriers to mitigate blind spots that can be caused by reflections received from the transmissive medium.

Figure 1:
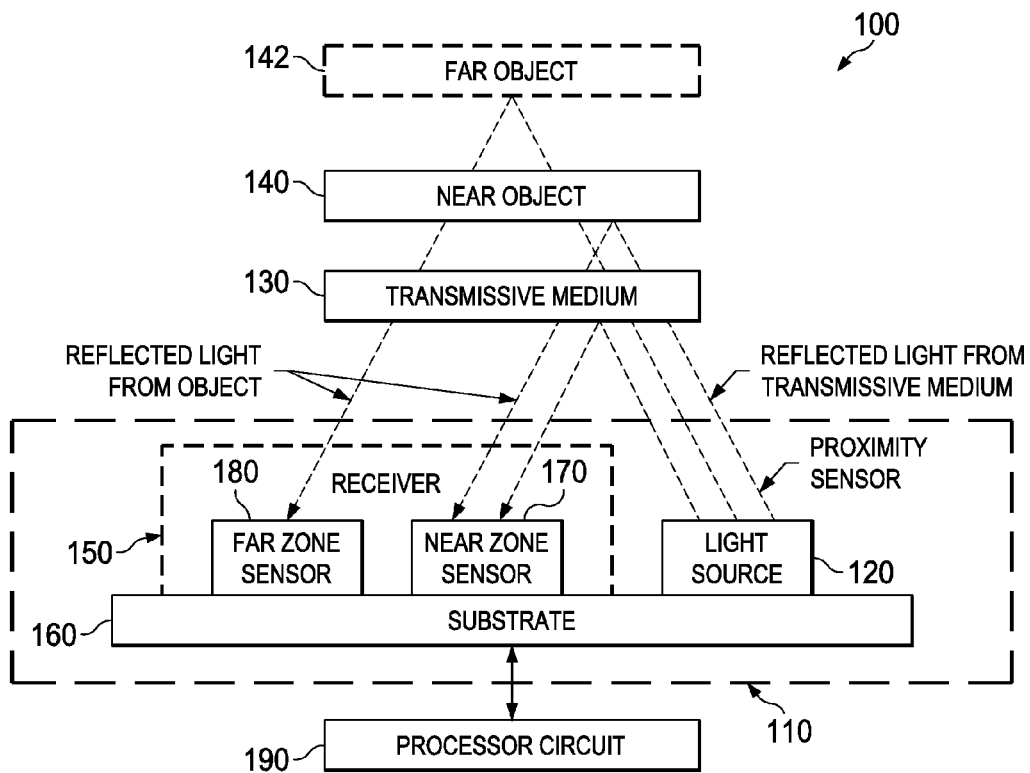
FIG. 1 illustrates an example of a system that employs multiple optical sensors.

FIG. 1 illustrates an example of a system 100 that employs multiple receiving sensors to detect objects at varying distances. A proximity sensor 110 can be provided as an apparatus to detect the presence of objects using light as an excitation source. The proximity sensor 110 includes a light source 120 such as a light emitting diode (LED), for example, to generate light through an optically transmissive medium 130 (e.g., glass, plastic, transparent/semi-transparent film) to an object to be detected. The object to be detected when at close distances to the proximity sensor 100 is shown as a near object 140 and when shown at farther distances the object is shown as a far object 142. In some examples, the light source 120 can be a light source that is configured to emit light at non-visible wavelengths, such as in the infrared (IR) spectrum, ultraviolet (UV) spectrum, or the like. In other examples, the light source 120 can emit wavelengths in the visible spectrum.

A receiver 150 in the proximity sensor 110 includes multiple sensors that are positioned on a substrate 160 to discriminate reflected light received from the near object 140 and far object 142 from light reflected by the optically transmissive medium 130 (also referred to as transmissive medium) in response to the light emitted by the source 120. As used herein, the term substrate can include a semiconductor substrate, a printed circuit board (PCB) acting as a substrate, or a combination of an integrated circuit substrate and a PCB substrate. The receiver 150 can include a near zone light sensor 170 and a far zone light sensor 180 that are positioned on the substrate 160 with the light source 120. The near zone light sensor 170 can be positioned on the substrate 160 to receive reflected light from the near object 140 and the transmissive medium 130 whereas the far zone light sensor 180 is positioned on the substrate to receive reflected light from the far object 142. Each sensor 170 and 180 includes one or more optical detectors that provide a corresponding detector output signal in response to detect light (e.g., reflected from the transmissive medium and/or an external object) in the wavelength emitted by the light source 120.

A processor circuit 190 can be operatively coupled to the substrate 160 to process output signals from the near zone light sensor 170 and the far zone light sensor 180. By way of example, the processor circuit 190 can include an analog digital converter (A/D) (not shown) to digitize outputs from the sensors 170 and 180. The processor circuit 190 can also include a processor (not shown) and memory (not shown) to process output from the A/D. The processor circuit 190 can compare outputs from the sensors 170 and 180 to predetermined thresholds to determine the presence of the object 140 within a predetermined distance to an external surface of the transmissive medium 130. For instance, the processor circuit 190 can determine that the object 140/142 is within the predetermined distance based upon one or both of the sensors 170 and 180 having its output above the predetermined thresholds. The thresholds can be fixed or adjustable in response to a user input. As used herein, the term "circuit" can include a collection of active and/or passive elements that perform a circuit function such as the proximity sensor 110 or the processor circuit 190, for example. The term circuit can also include an integrated circuit where all the circuit elements are fabricated on a common substrate, for example.

Output signals from the near zone light sensor 170 can be calibrated by the processor circuit 190 to provide an operating range that allows light to be received above the level of the light reflected from the transmissive medium 130 as to enable detecting the presence of near objects 140 that are closer to the receiver 150. For example, if no object 140 is present, the light reflected from the transmissive medium 130 can be stored as a baseline digital value by the processor circuit 190, for example. Detected light from the near zone light sensor 170 coming from the near object 140 above the baseline value can then be considered a detection of the near object 140 with the value above the baseline indicating a relative proximity of the object to the receiver. Thus, the predetermined threshold for the near zone sensor 170 can be set in the processing circuit 190 to above the baseline value, such that by exceeding the baseline by the established amount the presence of an object within the predetermined distance from the receiver (or exterior surface of the transmissive medium 130) can be detected.

The far zone light sensor 180 can be positioned on the substrate 160 to receive a reduced quantity of the reflected light from the transmissive medium 130 than received by the near zone light sensor. By virtue of spatial positioning on the substrate 160 (e.g., far zone sensor positioned further from light source on the substrate than near zone sensor), substantially none of the reflected light from the transmissive medium 130 is received by the far zone light sensor 180. That is, the far zone light sensor 180 is positioned and/or configured to receive substantially only light reflected from the far object 142 in response to reflected light emitted from the source 130 (also referred to as reflected source light). Accordingly, the far zone light sensor 180 can detect the far object's presence at further distances from the receiver 150 than detected by the near zone light sensor 170. The processor circuit 190 can compare output of the far zone light sensor 180 to a predetermined threshold set for the far zone sensor. By analyzing output from both the near zone light sensor 170 and far zone light sensor 180, objects 140/142 can be detected at varying distances with respect to predetermined threshold values set for each sensor while obviating the need to employ restrictive mechanical barriers to mitigate blind spots that can be caused by reflections received from the transmissive medium 130.

Figure 2:
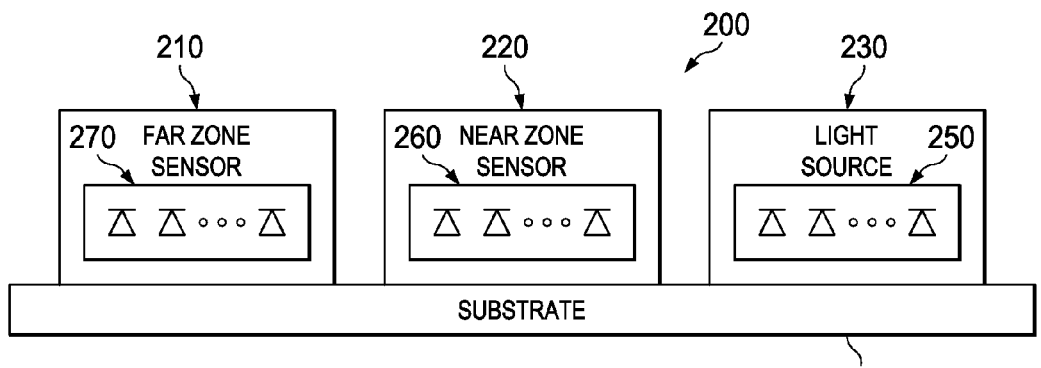
FIG. 2 illustrates an example of a proximity sensor apparatus having a far zone sensor, a near zone sensor, and a light source.

As disclosed herein with respect to FIG. 2, each of the near zone light sensor 170 and the far zone light sensor 180 can include one or more photodetectors that detect light in a predetermined wavelength that is provided from the light source 120, such as reflected light from the object 140/142 and/or transmissive medium 130. Where multiple photodetectors are employed in the sensors 170 or 180, different threshold values can be set and analyzed for the respective photodetectors. For example, each photodetector can be implemented as a photodiode that produces an electrical current according to the illuminance of light received (in the wavelength of the light source—e.g., one or more light emitting diodes). In some examples, the far zone light sensor 180 can be configured with photodetectors that have higher sensitivity to detect objects at greater distances than the near zone sensor 170. In other examples, the sensitivity level of the photodetectors in the near zone light sensor 170 and the far zone light sensor 180 can be configured substantially the same. In one example, the far zone light sensor 180 can be positioned on the substrate 160 such that substantially none of the reflected light from the transmissive medium 130 is received in response to light emitted from the source 120. For example, the angle of reflection for the light incident on the proximal internal surface of the transmissive medium 130 provided from the source 120 is insufficient to enable the reflected light from the surface to reach the far zone sensor 180, which is spaced further away from the light source 120 on the substrate 160.

In another example, reflected light from the transmissive medium 130 can be reduced at the far zone light sensor 180 by utilizing a focusing lens and/or pin hole aperture in a housing of the sensor to restrict light reflected from a surface (e.g., internal or external surface) of the transmissive medium 130 from reaching the far zone light sensor 180. Several example embodiments of the far zone sensor are disclosed herein with respect to FIGS. 3-6.

As a further example, distance of the object 140/142 can be determined by comparing received photodetector signal values between photodetectors of the respective near zone sensor 170 and the far zone sensor 180. For example, photodetector arrays can be employed where each detector in the array receives a slightly different angle of reflected light from the object 140/142, where analyzing output (e.g., A/D values) from the different detectors in the array can be utilized to determine how far the object 140/142 is from the receiver 150.

By utilizing multiple receiving sensors in the system 100, various complexities associated with conventional single photodetector systems can be mitigated. For instance, conventional single photodetector systems have certain complexities that must be considered when receiving the reflected light. For example, as the light is generated from the LED though glass, reflections from the glass can also be picked up by the single photodetector which can be confused with signal detected from an object. At certain distances between the object to be detected and the photodetector, blind spots can occur where it cannot be determined whether or not the object is detected or merely reflections detected from the glass. One conventional solution to this problem is to employ opto-mechanical barriers in the proximity detector to guide both the LED emission pattern from the LED and the receiving field of view of the photodetector to mitigate blind spots. Such barriers add expense to the proximity sensor and require sub-millimeter positioning during manufacturing which adds further expense to the sensor.

FIG. 2 illustrates an example of a proximity sensor apparatus 200 having a far zone sensor 210, a near zone sensor 220, and a light source 230 that are collectively mounted to a substrate 240 to detect objects at varying distances. As shown, the light source 230 can include one or more light emitting diodes (LED) 250 to generate light. For instance, a single LED (or other type light source e.g., bulb) is employed as the light source 230 to generate light. As noted above, the light source 230 can generate light in a predetermined wavelength spectrum, such as in the visible spectrum or the non-visible spectrum, for example.

Each of the near zone light sensor 220 and the far zone light sensor 210 can include one or more photodetectors 260 and 270, respectively to detect light reflected from the object and/or from the transmissive medium in response to light from the source 230, as described above. If multiple photodetectors are employed in the sensors 260 or 270, different threshold values can be set and analyzed for each of the respective photodetectors. In some examples, the far zone light sensor 210 can be configured with photodetectors 270 that have higher sensitivity to detect low levels of illumination, such as corresponding to objects at greater distances from the exterior surface of the transmissive medium, than the sensitivity of the near zone sensor 220. In other examples, the sensitivity level of the photodetectors 260 in the near zone light sensor 220 and the far zone light sensor 210 can be configured substantially the same. If the light source 230 is in the visible spectrum, then the photodetectors 260 and 270 would be selected for operation in the visible spectrum. If the light source 230 generates light in the infrared or UV spectrum, for example, then the photodetectors 260 and 270 would be selected for operation in the infrared or UV spectrum, respectively.

Figure 3:
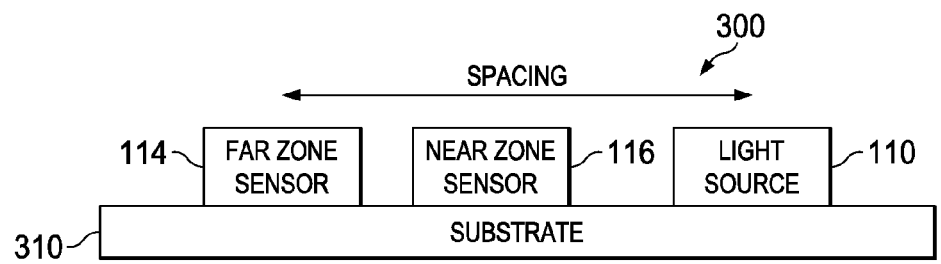
FIG. 3 illustrates an example of a proximity sensor apparatus where sensor spacing on a substrate is employed to reduce reflected light received from an optically transmissive medium.

FIG. 3 illustrates an example of a proximity sensor apparatus 300 where sensor spacing on a substrate 310 is employed to reduce a quantity of reflected light received from an optically transmissive medium (such as optically transparent sheet of glass or crystal). In this example, a far zone light sensor 320 is spaced at a further distance along the substrate 310 from a light source 330. As shown, a near zone light sensor 340 is spaced closer on the substrate 310 to the light source than the far zone light sensor 320. By spacing the far zone light sensor 320 a sufficient distance away from the light source 330 on the substrate 310, internally reflected light that may be received from a surface of a transmissive medium (medium 130 in FIG. 1) can be substantially reduced compared to the internally reflected light received a the near zone light sensor. As noted previously, the near zone light sensor 340 may receive reflected light from the transmissive medium and can have its output calibrated (e.g., to a lower relative sensitivity compared to the far zone light sensor) such that object detection is determined at an aggregate threshold value (e.g., light from transmissive medium and object forming aggregate value) that is above a baseline amount of the light reflected from the interior adjacent surface of the transmissive medium. Since the far zone light sensor 320 receives lower amounts of illumination in response to light from the source, the far zone light sensor can have a higher sensitivity than the near zone light sensor 340. Additionally or alternatively, the far zone light sensor 320 can utilize devices such as a lens to focus rays from the object when it is at greater distances to facilitate its light sensing function. Thus, the combination of the near zone sensor 340 and the far zone sensor 320 can be utilized to detect objects at varying distances to the apparatus 300.

Figure 4:
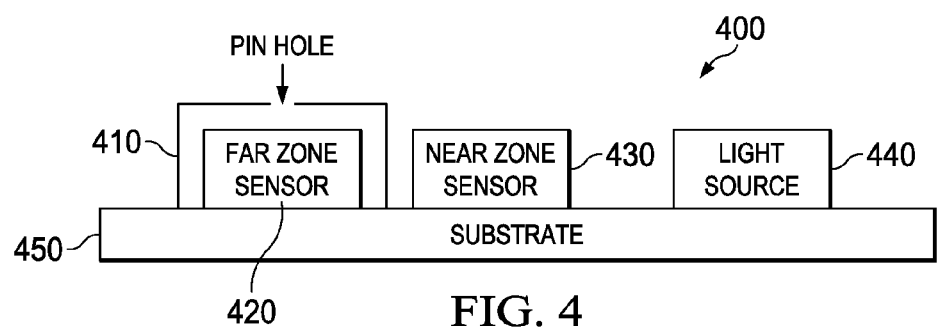
FIG. 4 illustrates an example of a proximity sensor apparatus where a housing having a baffle is employed to reduce reflected light received from an optically transmissive medium.

FIG. 4 illustrates an example of a proximity sensor apparatus 400 where a housing 410 having a baffle (e.g., pin hole aperture) is employed to reduce a quantity of reflected light received by a far zone light sensor 420 in response to light from a source 440 being reflected off an adjacent (internal) surface of an optically transmissive medium. In this example, in addition to spacing of the far zone light sensor 420 and a near zone light sensor 430 with respect to a light source 440 on a substrate 450, a baffle (or baffling structure) such as a pin hole aperture in the housing 410 can be employed to further reduce the quantity of reflected light (in addition to sensor spacing) that may be received by the far zone light sensor 420 from the reflected light received from the transmissive medium.

Figure 5:
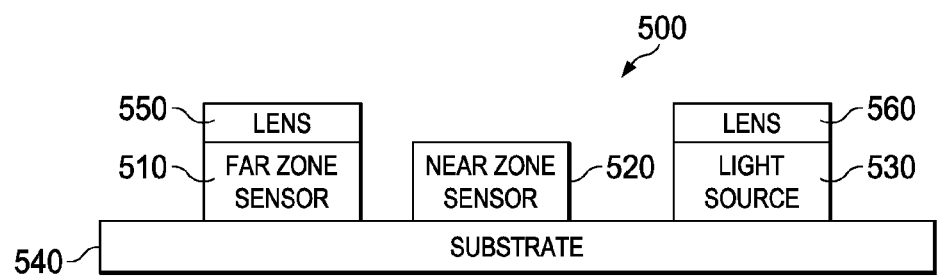
FIG. 5 illustrates an example of a proximity sensor apparatus where a lens is employed to collimate reflected light at a sensor and restrict the field of view of the sensor to reduce reflected light received from an optically transmissive medium.

FIG. 5 illustrates another example of a proximity sensor apparatus 500. The apparatus 500 includes a lens is employed to receive light at a sensor and directed the receive light to one or more optical detectors. In this example, a far zone light sensor 510 is positioned adjacent a near zone light sensor 520 which is positioned adjacent a light source 530 on a substrate 540. The far zone light sensor 510 can employ a lens 550 to receive light within a predefined field of view while mitigating reflected light from the transmissive medium at the far zone light sensor 510. That is, as mentioned above, the lens can restrict the field of view of the sensor to reduce a quantity of reflected light received from the transmissive medium. The lens 550 also can be employed to increase the distance at which objects can be sensed by the far zone light sensor 510. Additionally, in some examples, a lens 560 can be utilized to direct light from the light source 530 as a collimated beam through the optically transmissive medium toward the object that is to be detected, as described herein. Collimating the beam helps minimize the amount of light that reflects from the transmissive medium to the far zone sensor, for example. Although not shown, a lens can also be employed to receive reflected light for the near zone light sensor 520.

Figure 6:
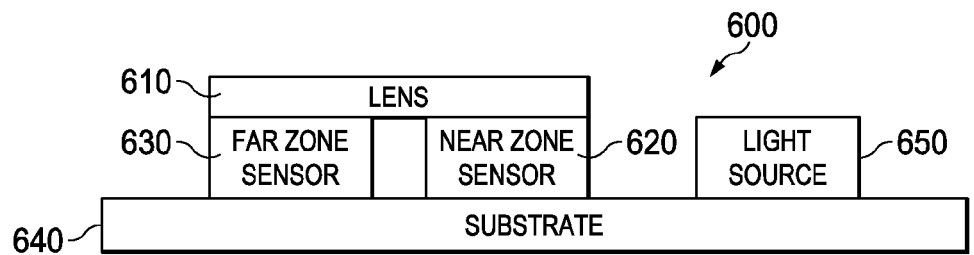
FIG. 6 illustrates an example of a proximity sensor apparatus where a lens is employed to receive reflected light for both a near zone sensor and a far zone sensor of the apparatus.

FIG. 6 illustrates an example of a proximity sensor apparatus 600 where a lens 610 is employed to receive light for both a near light zone sensor 620 and a far zone light sensor 630 that are positioned on a substrate 640 with a light source 650. Although not shown in this example, the lens 610 could be extended to cover the light source 650. In another example, a separate lens (not shown) could be employed over the light source 650 to focus generated light from the source. In some examples, a photodetector selector switch (See e.g., FIG. 8) can be employed to selectively operate one or more photodetectors of the near zone light sensor 630 and/or the far zone light sensor 620 under the lens 610 (or the sensor 510 under lens 550 in FIG. 5). In one example, sensors 620 and 630 could be configured as a continuous array of sensors. Such selective control can be employed to adjust for mechanical tolerances that may exist between the lens 610 and the respective sensors. Such selection can also be employed to select which one or more of the plurality of photodetectors are employed as near zone light sensors and which ones are selected as far zone light sensors, for example in the example of FIG. 6.

Figure 7:
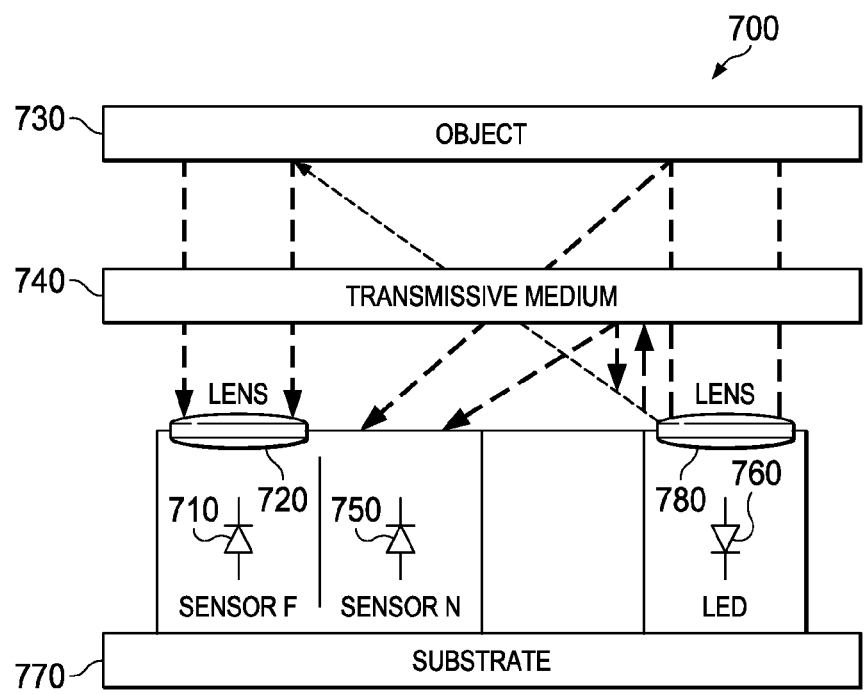
FIG. 7 illustrates a proximity sensor apparatus that employs a far zone sensor and lens to receive reflected light from an object though an optically transmissive medium and employs a near zone sensor that receives reflected light from the object and the transmissive medium.

FIG. 7 illustrates a proximity sensor apparatus 700 that employs a far zone light sensor 710 and lens 720 to receive light, including reflected light from an object 730 though a transmissive medium 740 (e.g., glass or plastic) in response to light provided by a light source 760. The apparatus 700 employs a near zone light sensor 750 that receives light, including reflected light from the object 730 and the transmissive medium 740 in response to light provided by the light source 760. The light source 760 can be an LED source 760 that is positioned on a substrate 770 with the sensors 710 and 750. As shown, a lens 780 can be utilized to direct light from the LED source 760 toward the object 730

By utilizing a system approach, and employing multiple sensors 710 and 750, and suitable optical structures 720 and 780, optical signals reflected from the transmissive medium 740 and from the object 730 can be spatially separated and discriminated by the sensors 710 and 750 to achieve desirable sensor performance without the use of mechanical barriers external to the sensing apparatus. In this example, the lens 780 over the LED source 760 and lens 720 over the far zone sensor 710 collimate both the LED beam, and the field of view of the sensor 710. This prevents substantially any light reflecting from the surface (interior or exterior) of the transmissive medium 740 from entering the field of view and being detected by the far zone light sensor 710. Thus, the system can sense objects far away, which will have small reflected signals, without being encumbered by substantial internal reflections from the transmissive medium 740 in response to the light generated by the source 760.

If only a single sensor were employed as in conventional systems, a blind zone may occur when the object is at closer distances. To detect objects within the blind zone, the near zone light sensor 750 is employed. Thus, the near zone light sensor 750 is used for sensing detection the object 730 when closer to the exterior surface of the transmissive medium 740 hence the reflected optical signal from the object will be strong. The near zone sensor 750 will also receive additional reflected light from the transmissive medium, but the object 730 can still be detected based on a calibration procedure (e.g., as described above with respect to FIG. 1), since the signal from the transmissive medium will be accounted for in the calibration. This calibration procedure may deteriorate however, when the signal from the object 730 is small compared to the signal from the transmissive medium 740. Thus, by measuring both the far zone sensor 710 and near zone sensor 750, the object 730 can be fully detected behind the transmissive medium 740 with no blind zone affecting suitable detection of the object.

Figure 8A:
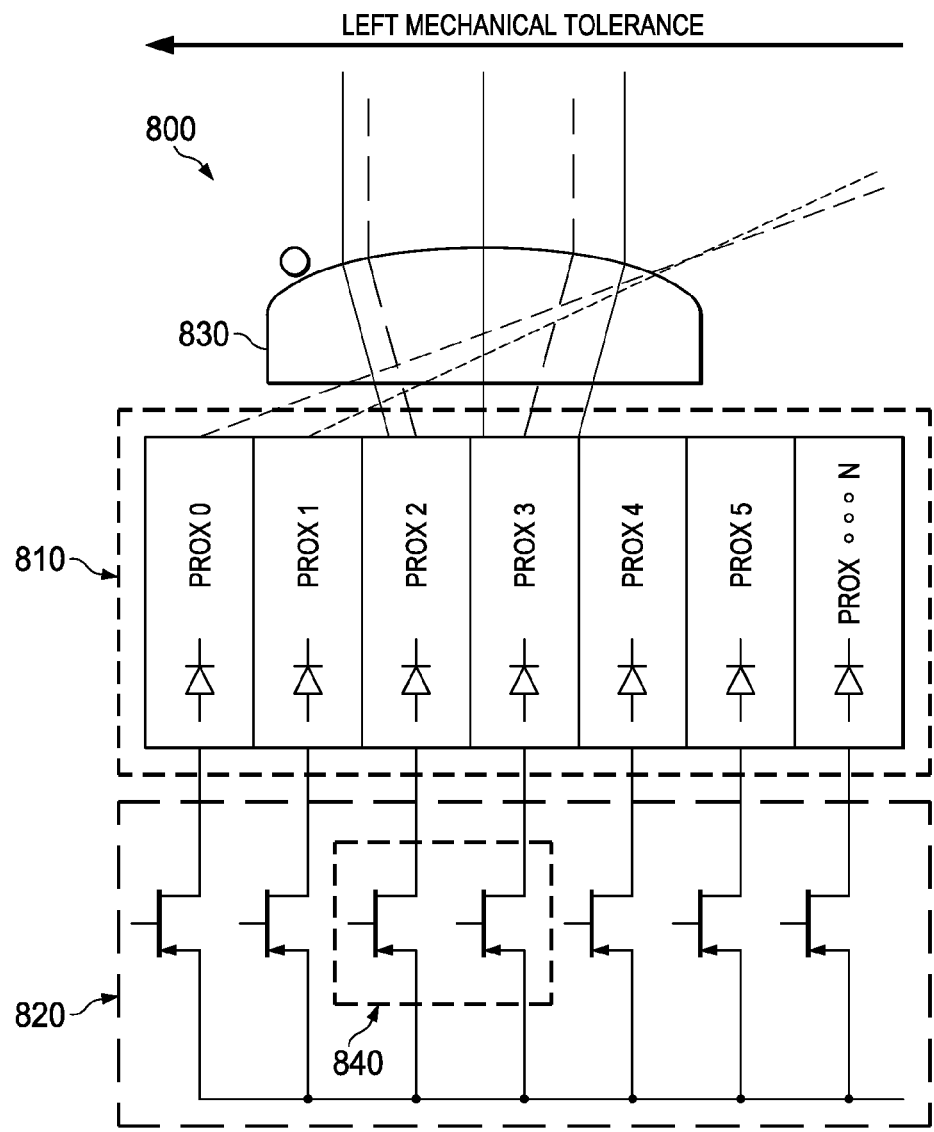
FIGS. 8A and 8B illustrate examples of an adjustable sensor array that can be employed with a proximity sensor apparatus to selectively position multiple sensors within a desired field of view of a collimating lens.
Figure 8B:
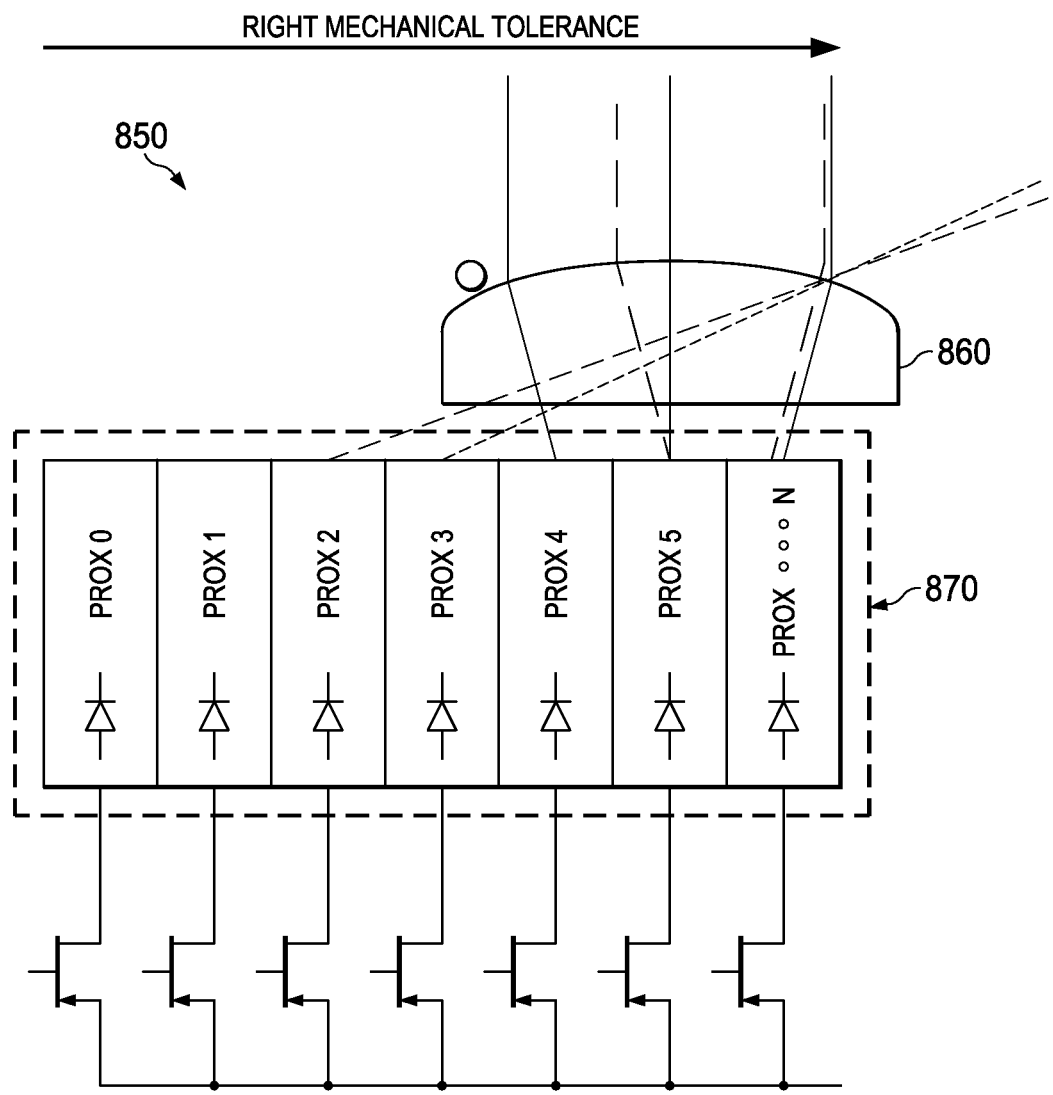

FIGS. 8A and 8B illustrate examples of an adjustable sensor array that can be employed with a proximity sensor apparatus to selectively position multiple sensors within a desired field of view of a collimating lens (e.g., or other structure that restricts the field of view). In FIG. 8A, a sensor apparatus 800 includes a photodetector array 810 and photo detector selector switch device 820 is shown that receives light from a lens 830. In this example, due to manufacturing or other tolerances (e.g., environmental conditions), the lens 830 is positioned generally to the left of the array 830. To position a desired subset of photodetectors in the array under the lens 830, selector switches in the switch device 820 can be activated to select the desired subset. In this example, a switch 2 and 3 at 840 could be selected to provide photodetector centering under the lens 830. If an LED were positioned on a substrate with the array 810 (e.g., to the right of the array), the left most selected detector could be configured as the far zone sensor and the right most selected detector selected as the near zone sensor. In other examples, multiple detectors of the array 810 could be selected for the far zone sensor and/or the near zone sensor described herein.

The detector array 810 and switch device 820 can be included with an apparatus that includes a light source to generate light through a transmissive medium to an object, such as disclosed herein with respect to FIGS. 1 through 7. The detector array 810 can be configured as a receiver that includes a plurality of photodetectors. At least one of the plurality of photodetectors is configured as a near zone light sensor and at least one of the plurality of photodetectors is configured as a far zone light sensor as selected by the switch device 820, where the plurality of photodetectors are positioned on a substrate with the light source. The near zone light sensor is positioned on the substrate to receive reflected light from the object and the transmissive medium and the far zone light sensor is positioned on the substrate to receive the reflected light from the object and to receive a reduced quantity of the reflected light from the transmissive medium. The lens 830 is positioned over the plurality of selected photodetectors to focus light received from the transmissive medium and the object on to the plurality of photodetectors. The photodetector selector switch device 820 selects a subset of the plurality of photodetectors such that the subset is positioned under the lens 830.

In the example of FIG. 8B, the sensor apparatus includes a lens 860 is positioned to the right of array 870. In this example, to facilitate alignment, switches to the right (from those depicted at 800) can be selected to activate the desired subset of photodetectors employed to provide the near zone and far zone sensors described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus comprising:
   a light source to generate source light through an optically transmissive medium to an object; and
   a receiver comprising a near zone light sensor and a far zone light sensor positioned on a substrate with the light source, wherein the near zone light sensor is positioned on the substrate to, in response to the generated source light, receive reflected source light from the object and the optically transmissive medium, and the far zone light sensor is positioned on the substrate to, in response to the source light, receive the reflected source light from the object and to receive a reduced quantity of the reflected source light from the optically transmissive medium compared to the near zone light sensor.

2. The apparatus of claim 1, wherein each of the near zone light sensor and the far zone light sensor further comprise a plurality of photodetectors to receive the reflected source light generated by the light source.

3. The apparatus of claim 2, further comprising a receiver lens between at least one of the photodetectors and the optically transmissive medium to receive the reflected source light from the object and to mitigate reception of reflected source light from the optically transmissive medium.

4. The apparatus of claim 3, further comprising a light source lens to direct the source light generated by the light source through the optically transmissive medium and toward the object.

5. The apparatus of claim 3, further comprising a selector switch device to activate a selected set of at least one of the photodetectors to receive the collimated light from the receiver lens.

6. The apparatus of claim 1, wherein the far zone light sensor further comprises a housing that includes an aperture to reduce the quantity of the reflected source light received by the far zone light sensor that is reflected from an interior surface of the optically transmissive medium.

7. The apparatus of claim 1, wherein the light source is a light emitting diode (LED) that generates light in the visible spectrum, the infrared spectrum or the ultraviolet spectrum.

8. The apparatus of claim 1, wherein the optically transmissive medium comprises an optically transparent glass covering that resides between the object and the receiver.

9. The apparatus of claim 1, further comprising a processor circuit that receives a signal from each of the near zone light sensor and the far zone light sensor, wherein the processor circuit compares each of the received signals to a respective predetermined threshold setting for each of the respective signals to detect the presence of the object.

10. The apparatus of claim 9, wherein the processor circuit sets a calibration threshold for the near zone light sensor according to the reflected source light received from a surface of the optically transmissive medium such that aggregate reflected source light received from the object and from the surface of the optically transmissive medium are above the calibration threshold and utilized to detect the presence of the object.

11. The apparatus of claim 9, wherein the processor circuit analyzes the received signal from each of the near zone light sensor and the far zone light sensor to determine a distance between the object and the receiver.

12. An apparatus comprising:
    a light source to generate source light through an optically transmissive medium to an object;
    a receiver comprising a plurality of photodetectors, at least one of the plurality of photodetectors configured as a near zone light sensor and at least one of the plurality of photodetectors configured as a far zone light sensor, the plurality of photodetectors being positioned on a substrate with the light source, wherein the near zone light sensor is positioned on the substrate to receive reflected source light from the object and the optically transmissive medium, and the far zone light sensor is positioned on the substrate to receive the reflected source light from the object and to receive a reduced quantity of the reflected source light reflected from a surface of the optically transmissive medium;
    a lens positioned over the plurality of photodetectors to focus the source light received from the optically transmissive medium and the object on to the plurality of photodetectors; and
    a photodetector selector switch device to selectively activate a subset of the plurality of photodetectors corresponding to the near zone light sensor and the far zone light sensor such that the subset of photodectors is positioned under the lens to receive the focused source light.

13. The apparatus of claim 12, further comprising a light source lens to direct the source light generated by the light source toward the object.

14. The apparatus of claim 12, wherein the far zone light sensor further comprises a housing that includes an aperture to reduce the quantity of reflected source light received by the far zone light sensor from the optically transmissive medium.

15. The apparatus of claim 12, wherein the light source is a light emitting diode (LED) that generates the source light with a wavelength in a visible spectrum, an infrared spectrum or an ultraviolet spectrum, each of the photodetectors are configured to detect the reflected source light with the wavelength.

16. The apparatus of claim 12, wherein the optically transmissive medium comprises a sheet of an optically transparent glass or plastic material that resides between the object and the receiver.

17. The apparatus of claim 12, further comprising a processor circuit that receives an electrical signal from each of the near zone light sensor and the far zone light sensor, wherein the processor circuit compares each of the received electrical signals to a predetermined threshold setting for the respective signals to detect the presence of the object.

18. The apparatus of claim 12, wherein the processor circuit sets a calibration threshold for the near zone light sensor according to the reflected source light received from a surface of the optically transmissive medium such that aggregate reflected source light received from the object and from the surface of the optically transmissive medium are above the calibration threshold and utilized to detect the presence of the object.

19. A system comprising:
   a light source to generate source light through an optically transmissive medium to an object;
   a receiver comprising a near zone light sensor and a far zone light sensor positioned on a substrate with the light source, wherein the near zone light sensor is positioned on the substrate to receive reflected source light from the object and the optically transmissive medium and to provide a near sensor output signal in response to the received source light, and the far zone light sensor is positioned on the substrate to receive the reflected source light from the object and to receive a reduced quantity of the reflected source light reflected from a surface of the optically transmissive medium and to provide a far sensor output signal in response to the received source light; and
   a processor circuit to detect presence of the object by comparing the near sensor output signal to a predetermined near zone threshold and comparing far sensor output signal to a predetermined far zone threshold, wherein presence of the object is detected if at least one of the near zone threshold or the far zone threshold is exceeded.

20. The apparatus of claim 19, wherein the near zone light sensor and the far zone light sensor further comprises a plurality of photodetectors arranged to receive the reflected source light generated by the light source,
   the apparatus further comprising:
   a receiver lens between the photodetectors and the optically transmissive medium to receive the reflected source light from the object and provide the received light to at least some of the plurality of photodetectors; and
   a selector switch device that selectively activates a subset of the plurality of photodetectors, corresponding to the near zone light sensor and the far zone light sensor, to reside under the lens to receive the focused source light.

* * * * *